Sept. 6, 1960 R. T. WINDSOR 2,951,503
PILOT CONTROL DIAPHRAGM VALVE
Filed July 20, 1955
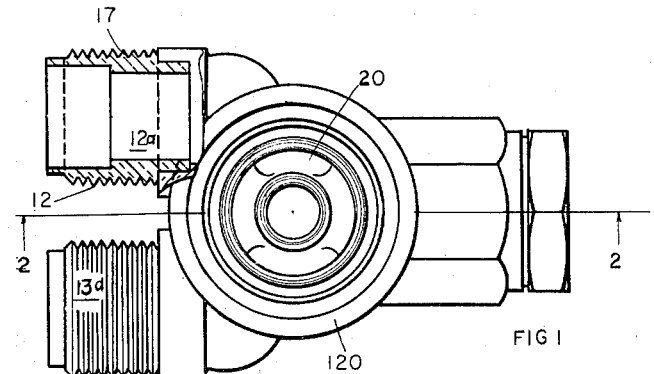
FIG 1
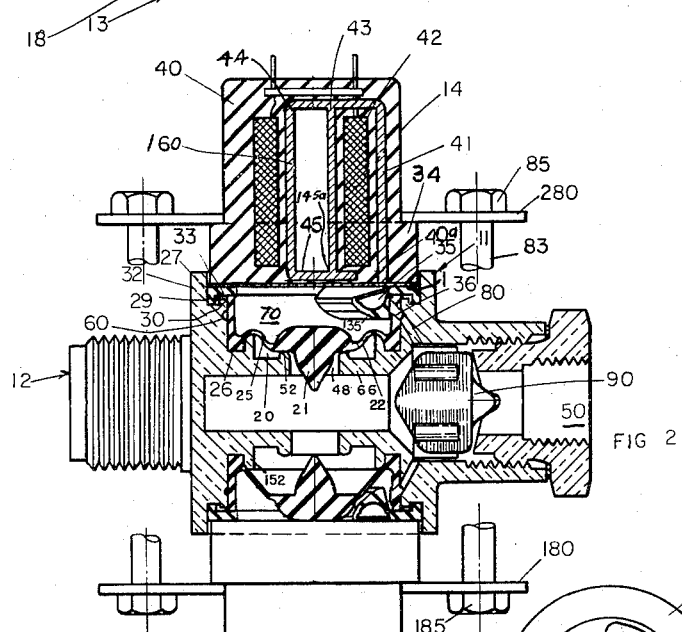
FIG 2
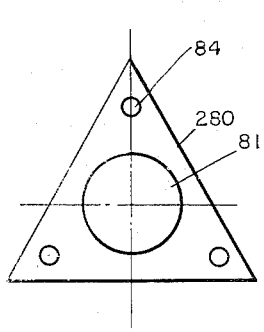
FIG 3
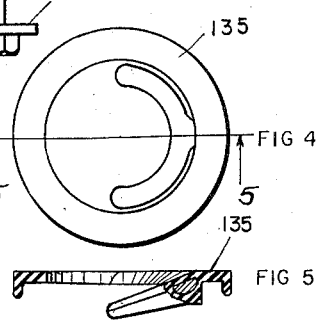
FIG 4
FIG 5
INVENTOR.
Richard T. Windsor
BY
Charles L. Lorencheck
Atty.

United States Patent Office 2,951,503
Patented Sept. 6, 1960

2,951,503

PILOT CONTROL DIAPHRAGM VALVE

Richard T. Windsor, Edinboro, Pa., assignor to Hays Manufacturing Company, Erie, Pa., a corporation of Pennsylvania Filed July 20, 1955, Ser. No. 523,229

3 Claims. (Cl. 137—606)

This invention relates to diaphragm valves and more particularly to a diaphragm valve of the so-called pilot operated or pilot control type.

Various types of pilot operated diaphragm valves have been designed in the past. Many of them have utilized metal moving parts exposed to contact with the fluid controlled by the valve and operated by a solenoid which opened and closed pilot orifices in a diaphragm supporting the valve actuating member. The metal parts were frequently affected by corrosion and erosion resulting from contact with the liquid. Furthermore, these prior valves were often rough and sometimes erratic in operation. The various parts were expensive to manufacture. The present invention provides a pilot operated diaphragm valve wherein no moving metal parts come into contact with or are subjected to the flow of fluid. This will reduce noise of operation.

Many of the same ideas and conceptions disclosed herein could also be used in pilot controlled valves other than solenoid operated valves. For example, the ideas and conceptions disclosed herein could be used on two-way valves or on three-way valves, manually operated valves, and other type valves. Many solenoid operated valves now known have a pronounced sixty cycle hum. It has been discovered that by the use of the improvements and ideas disclosed herein, a solenoid operated valve can be produced which is sufficiently quiet that it is satisfactory for use in home air conditioning units. Valves now considered quiet enough to be suitable for application in home air conditioning systems are usually of a motor driven type and are considerably more expensive than the valve disclosed herein. Further, by use of the valve disclosed herein, since no metal operating parts are exposed to fluid flowing through the valve, pure iron can be used embedded in the rubber, thus providing a more efficient magnetic circuit with less critical materials used therein.

In other similar valves, it has been necessary to use stainless steel for the operating parts because of corrosion problems. Since stainless steel has poor magnetic characteristics, the parts of present solenoid valves made to withstand corrosive conditions and embodying stainless steel in parts exposed to contact with liquid must be made heavier than when the parts are made of soft iron. Since the metal parts of the valve disclosed herein are enclosed, plain iron can be used for the magnetic circuit of the valve and the magnetic circuit is, therefore, more efficient. Greater operating economy of the valve also results. The parts of the pilot of the valve disclosed herein could also be made of stainless steel, however, and an improvement in the structure over prior valves would still result.

Specifically, an object of this invention is to provide a pilot operated diaphragm valve which is simple in construction, economical to manufacture, reliable in operation, and simple and efficient in operation and use.

Another object of the invention is to provide a pilot operated diaphragm valve wherein a powdered magnetic metal impregnated rubber is used for the moving parts of the pilot valve and the pilot valve is controlled by a solenoid.

Another object of this invention is to provide a pilot operated diaphragm valve wherein the pilot on the valve has a metal core completely enclosed by rubber or material having similar flexible properties and is, therefore, not corrosive.

A further object of this invention is to provide a valve wherein pure iron is used in the magnetic circuit but is sealed out of contact with all water flowing through the valve.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawing:

Fig. 1 is a top view of the valve disclosed herein;

Fig. 2 is a cross sectional view taken on line 2—2 of Fig. 1;

Fig. 3 is a view of the bracket for holding the solenoid to the valve body;

Fig. 4 is a top view of the pilot valve; and

Fig. 5 is a cross sectional view of the pilot control for the valve.

Now with more specific reference to the drawings, a pilot operated valve illustrated in Fig. 1 has a housing or body 11 which is generally cylindrical having an inlet 12 which could be connected to a cold water pipe and an inlet 13 which could be connected to a hot water pipe. It will be noted that inlet passage 12a and inlet passage 13a constitute first pressure chambers which are provided for connecting to proper cold and hot water lines, respectively. A solenoid 14 actuates a pilot valve member 135 to control the cold water and a similar solenoid 15 is provided to control the flow of hot water through the inlet passage 13a. The inlet 12 is threaded at 17 to provide means to conveniently connect it to a proper union or pipe fitting and a threaded member 18 is likewise provided for connection to a similar hot water inlet. The principles disclosed herein could be incorporated in a valve for controlling the flow of water in a single pipe.

Since the working parts of the hot water control and the cold water control are identical, only the cold water control will be described in detail. The cold water control comprises, as stated, the inlet passage 12a communicating with an inlet chamber 20 which is, when no water is flowing, closed by a valve seating member 21 which is on the downstream side thereof. Thus, no water flows into outlet passage 50 past flow control 90. The function of flow control 90 is to control the flow of water through the valve at a constant rate independent of pressure and its operation is explained in co-pending patent application, Serial No. 415,270, filed March 4, 1954, and now abandoned, of which I am joint inventor.

The pilot valve member 135 may be made of rubber and has insert member 35 therein made of rubber impregnated with iron particles to render it magnetic or it could be entirely made of iron. It could also be made of magnetic stainless steel. In either case, the magnetic field from the solenoid 14 will operate on the insert 35.

The valve seating member 21 is connected to the valve housing 11 by means of a diaphragm portion 25 which extends around the valve 135 and is integrally attached thereto. The diaphragm portion 25 is attached at its peripheral edge to a support portion 26 and the support portion 26 is integrally attached to a clamping portion 27 and has apertures 36 formed therein which communicate through a groove 60 and through a bore 80 with the outlet passage 50.

The valve housing 11 has a groove 29 having a flanged portion 30 extending upwardly inside it which interfits with the clamping portion 27 and flange 34 of the solenoid 14 fits inside upstanding flange 32 against the clamping portion 27 to hold the clamping portion 27 in place and form a seal therewith. A plastic sheet 1 forms a cover over the lower end of the solenoid 14. A web 33 has a groove U-shaped in cross section which the clamping portion 27 fits into and the solenoid 14 has the flange 34 thereon which interfits with the flange 32 on the housing member 11 and swingably supports the pilot valve 135 which is made of rubber like material.

The solenoid 14 has a housing 40 which may be made of a molded plastic having a coil 42 and a core 43 molded therein. The solenoid 14 is held in place on the housing 11 by a plate 280 which has a bore 81 therethrough to receive the solenoid 14 and plate 280 rests on the shoulder defined by flange 34. Bolts 83 extend through holes 84 and on through to plate 180 with a nut 185 thereon holding the plates 280 and 180 and, therefore, the two solenoids 14 and 15 are in clamped relation and clamping portion 27 and flanged portion 30 are in sealed relation on the housing 11. The solenoid 14 is made up of the housing 40 which has the iron magnetic core 43 and coil 42 molded therein. The core 43 is made of iron and has an inner cylindrical iron member 160 attached to the outer member at 44 and has a head 45 attached thereto at 145 which extends in spaced relation from the lower end 46 of the housing 11 so that iron 41 and the iron impregnated pilot valve member 135 form the armature for the core 41 and the insert 35 is urged to bridge the gap between the lower end of core 41 and head 45. Since the gap between the members 41 and 45 is at one side only, a high flux concentration results at this point when the solenoid 14 is excited.

When the solenoid 14 is not actuated to open pilot members and the pilots, therefore, are closed, water at line pressure will flow through the inlet passages 12a and 13a, chamber 20, and aperture 22, and pressure in chamber 70 will become equal to pressure in the chamber 20.

Since the area of the top of the valve seating member 21 in chamber 70 is greater than the lower side in chamber 20 and since the pressure is equal on both sides, the total force above will be greater than the total force below the valve member 135 and the seating member 21 will be held closed. When it is desired to cause cold water to flow through the outlet 50, the coil 42 of the solenoid 14 is actuated by applying an electric current thereto. This will cause the magnetic flux to flow through the iron member 41 and core 43 and establish a field across the gap therebetween to attract pilot valve 135 and cause it to move toward the housing 40 and off of its seating area around aperture 36. This will allow water to flow from chamber 70 through bore 80, causing the total pressure in chamber 70 to drop and, therefore, the pressure in the chamber 20 below the diaphragm 25 will exceed the pressure in chamber 70 above it. Therefore, the total force below the diaphragm 25 will be greater than the total force above and the pressure below will lift the seating member 21 off its seat 52 and allow water to flow through passage 48 through seat 52 into the outlet 50.

When the current in the solenoid coil 42 is interrupted, the pilot valve member 135 will drop and seat on its seat around aperture 36, thus stopping the flow of water through the bore 80. Water will flow through aperture or bleed orifice 22 and into the chamber 70 thereabove and since water now cannot escape through bore 80, pressure in the chamber 70 will increase to near line pressure.

Since the area above the diaphragm 25 in chamber 70 is greater than the area below, when the pressure above the diaphragm 25 in chamber 70 becomes equal to the pressure in inlet 12, the seating member 21 will be forced into position to rest on its seat 52 which surrounds passage 48 in partition 66, thereby closing the outlet passage 48 and stopping the flow of water through the valve housing 11.

The hot water supply will operate in all respects similar to the operation of the cold water valve to control the supply thereof.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A valve comprising a body member having a generally cylindrical hollow body portion with two inlets and an outlet, two spaced partitions extending across said hollow in said body portion, each said partition having a central aperture, flow passage means fluidly connecting said apertures in each said partition to said outlet, a peripheral shoulder spaced outwardly from each said partition, diaphragms made of rubber like material secured to said shoulders, means connected to said inlets to admit water under pressure between each said diaphragm and each said shoulder, a valve member on each said diaphragm adapted to close said apertures, a closed chamber outward of each said diaphragm, orifices in said diaphragms connected to passages in said body member leading to said outlet, means to admit fluid under pressure to each said chamber to cause said fluid therein to force said valve members on said diaphragms to close said apertures, means comprising pilot means made of rubber like material having ferrous material embedded therein swingably attached to said body member to open said orifices in said diaphragms to allow said fluid to flow from each said chamber to said outlet whereby said fluid pressure in said chambers is released and said valve is forced to an open position by fluid pressure from said inlets, and electromagnetic means on said body member adapted to move said pilot means with said ferrous material therein away from said orifices.

2. A pilot valve comprising a hollow body having an inlet and an outlet, a partition disposed between said inlet and said outlet, an aperture in said partition communicating between said inlet and said outlet, a cup shaped main valve diaphragm having a tubular side wall, said diaphragm defining with said body a first chamber to receive fluid under pressure on one side thereof, means on said diaphragm to close said aperture, said diaphragm defining with said partition a second chamber when said means thereon is in closing relation with said aperture, said inlet communicating with said second chamber, an aperture through said diaphragm connecting said first chamber to said second chamber, an opening through said tubular side wall of said diaphragm, an opening in said body communicating with said opening in said side wall connecting said first chamber with said outlet, a pilot valve comprising flexible material swingably connected to said diaphragm and swingable into engagement therewith to close said opening in said tubular side wall, said pilot valve having iron material therein, solenoid means on said valve, and means to energize said solenoid means to move said pilot valve away from said opening in said tubular side wall whereby fluid is allowed to flow from said first chamber to said outlet and fluid under pressure in said second chamber forces said diaphragm away from said partition.

3. The valve recited in claim 2 wherein said iron material in said pilot valve comprises powdered iron disposed therein.

(References on following page)

References Cited in the file of this patent

UNITED STATES PATENTS

| | | |
|---|---|---|
| 1,580,481 | Gavin | Apr. 13, 1926 |
| 1,587,380 | Hankey | June 1, 1926 |
| 1,804,462 | Eggleston | May 12, 1931 |
| 1,961,599 | Schwitzer | June 5, 1934 |
| 2,291,101 | Papulski | July 28, 1942 |
| 2,292,477 | Ray | Aug. 11, 1942 |
| 2,351,023 | Dunham | June 13, 1944 |
| 2,449,438 | Wisegarver | Sept. 14, 1948 |
| 2,588,137 | Marvin | Mar. 4, 1952 |
| 2,619,116 | Ralston | Nov. 25, 1952 |
| 2,619,986 | Goepfrick | Dec. 2, 1952 |
| 2,708,092 | Smith | May 10, 1955 |
| 2,712,324 | Lund | July 5, 1955 |